June 9, 1964
R. C. JENSEN
3,136,920
POWER FAILURE INDICATOR
Filed Aug. 15, 1960.
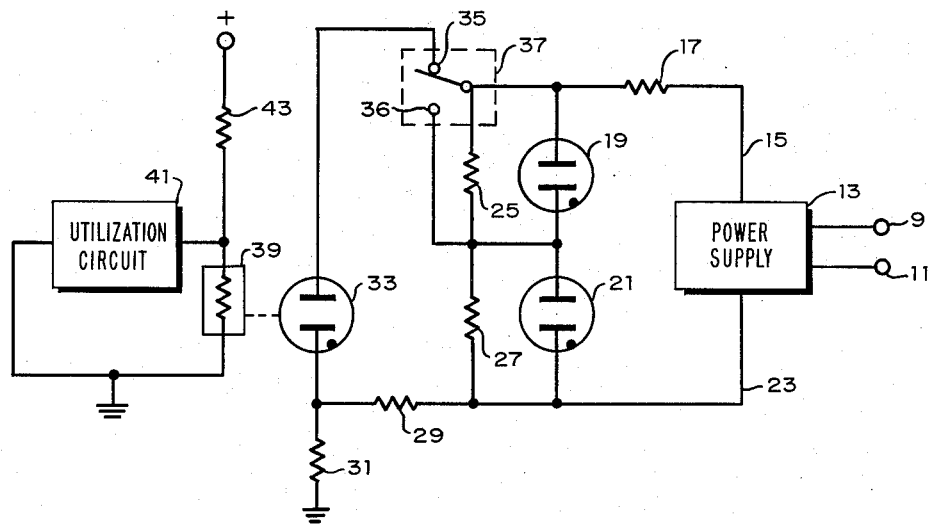
INVENTOR
RONALD C. JENSEN
BY *J. C. Chapman*
ATTORNEY

United States Patent Office 3,136,920
Patented June 9, 1964

3,136,920
POWER FAILURE INDICATOR
Ronald C. Jensen, Palo Alto, Calif., assignor to Hewlett-Packard Company, Palo Alto, Calif., a corporation of California
Filed Aug. 15, 1960, Ser. No. 49,643
10 Claims. (Cl. 315—129)

This invention relates to power failure indicators and more particularly to a bistable circuit using neon glow tubes for indicating the momentary interruption of the supply voltage.

Line operated equipment frequently require means to indicate the past occurrence of a momentary power failure. For instance, a line-operated clock may continue to operate after a momentary power failure and thus display the time inaccurately. It is necessary, then, to provide an indication of the inaccuracy which results from this momentary interruption of power. Mechanical power failure indicators are known which provide visual indication of a past power interruption and hence provide an indication of the inaccurately displayed time. Such indicators are usually reset by repositioning or lightly shaking the clock. Other types of power failure indicators using self-locking relays are also known, but these are generally expensive. Both of these types of indicators are subject to vibration failure and are therefore not suitable for marine or mobile operation. It is therefore desirable to provide line-operated equipment that is specially suited for mobile operation with an unexpensive power failure indicator which is insensitive to vibration and which has a long life. Such a device should provide an indication of a momentary power failure until it is intentionally reset by means of a manually-operated switch.

It is an object of the present invention to provide an inexpensive power failure indicating circuit which is insensitive to vibration and which has indefinitely long life.

In accordance with the illustrated embodiment of the present invention, two substantially similar neon glow tubes, each shunted by a high resistor, and a limiting resistor are serially connected between the terminals of a line operated power supply. A third neon glow tube having substantially lower firing and sustaining characteristic voltages than either of the serially connected tubes is connected to be ionized whenever the first two serially connected tubes are not conducting. A manual switch is provided to ionize the first two tubes, thereby holding the third tube in the non-conducting state until the conduction of the two tubes is interrupted as by a momentary power failure.

Other and incidental objects of the present invention will be apparent from a reading of this specification and an examination of the accompanying drawing which shows a schematic diagram of a circuit in accordance with an embodiment of this invention.

Referring now to the drawing, power supply 13 is shown with input terminals 9 and 11. Output terminal 15 of power supply 13 is connected to one terminal of resistor 17. Serially connected neon glow tubes 19 and 21 are connected between the other terminal of resistor 17 and output terminal 23 of power supply 13. Resistors 25 and 27 are connected in shunt with glow tubes 19 and 21 respectively. A voltage divider comprising resistors 29 and 31 is connected between the output terminal 23 and a point of reference potential, say ground. Neon glow tube 33 is connected between the common terminal of resistors 29 and 31 through the normally closed contact 35 of switch 37 to the common terminal of glow tube 19 and resistor 17. The common terminal of resistor 17 and glow tube 19 is connected through the normally open contact 36 of switch 37 to the common terminal of resistors 25 and 27.

In operation, the line voltage is applied to input terminals 9 and 11 of power supply 13, which may be a separate power supply or the power supply of associated equipment. Glow tube 33 is selected as one having lower starting and sustaining characteristic voltages than the substantially similar glow tubes 19 and 21. Sufficient voltage impressed across glow tube 33 causes the tube to fire. The current through the tube produces a voltage drop across resistor 17 which serves to reduce the voltage that appears across non-conducting glow tubes 19 and 21. Resistors 25 and 27 serve to divide the voltage appearing across tubes 19 and 21 evenly, thereby preventing them from firing as a result of uneven voltage distribution between the two non-conducting tubes. Thus, upon application of the line voltage to input terminals 9 and 11, glow tube 33 becomes ionized and the resulting current through resistor 17 prevents tubes 19 and 21 from firing.

The circuit remains in this first stable state until push button switch 37 is actuated to short glow tube 19 out through normally open contact 36. Glow tube 33 is extinguished when the connection through contact 35 is momentarily broken and glow tube 21 is fired as a result of the full power supply voltage impressed across it. When the short circuit connection around tube 19 through contact 36 of switch 37 is removed, tube 19 fires. The voltage that fires tube 19 is equal to the power supply voltage less the sustaining voltage of tube 21, less the voltage drop across resistor 17. When the switch 37 is returned to the normally closed position, glow tube 33 is again connected to the common terminal of resistor 17 and tube 19. The voltage that subsequently appears across glow tube 33 is designed to be less than the voltage required for ionization. The voltage across tube 33, then, is equal to the voltage at terminal 23 reduced by the division ratio of resistors 29 and 31 plus the voltage at terminal 15 less the voltage across resistor 17. A single glow tube may be used in place of tubes 19 and 21 if provided with means to cause tube conduction when the switch is actuated.

The circuit remains in this second stable state as long as current sufficient to sustain the ionization of tubes 19 and 21 is provided. If the voltage applied to input terminals 9 and 11 of power supply 13 is momentarily interrupted, glow tubes 19 and 21 will extinguish. Upon subsequent application of the line voltage to input terminals 9 and 11, the circuit will again operate in the first stable state wherein glow tube 33 is ionized and tubes 19 and 21 are held non-conductive by the resulting voltage drop across resistor 17.

An output signal indicative of the operating state of the circuit may be visually derived from the light output of ionized tube 33. In addition, an output signal to operate utilization circuit 41 may be derived from the current through tube 33 or from photocell 39 which is optically connected to tube 33, as shown.

It can be seen that the bi-stable circuit of the present invention remains in the manually set stable state until the power supplied to the circuit is interrupted. When the power supplied to the circuit is subsequently restored, the circuit operates in the other stable state until manually reset, thereby providing an indication of a momentary power interruption.

Thus, a bistable circuit responsive to momentary power interruptions is provided which uses neon glow tubes and other inexpensive components which have indefinitely long life and which are not subject to vibration failure.

I claim:
1. A bistable circuit comprising a line-operated direct-current power-supply having output terminals, a pair of serially connected gaseous discharge tubes, a resistor connected in shunt with each of said discharge tubes, current limiting means connected between one output terminal of said power supply and one of said discharge tubes, means connecting the other of said discharge tubes to the other output terminal of said power supply, a manually operated single pole switch having normally open and normally closed contacts, means connecting the pole of said switch to the common connection of said current limiting means and said one discharge tube, means including said normally open contact and responsive to the actuation of said switch to decrease the resistance in shunt with said one discharge, a voltage divider having an output terminal, said voltage divider connected between said other terminal of said power supply and ground, another glow discharge tube having lower starting and sustaining characteristic voltages that each of said serially connected discharge tubes, said other discharge tube being connected between the output terminal of said voltage divider and the said normally closed contact, and means to derive an output signal from one of the discharge tubes.

2. A bistable circuit responsive to momentary power-interruption, said circuit comprising a line-operated direct-current power-supply having output terminals, first and second serially connected gaseous discharge tubes having substantially similar starting and sustaining characteristic voltages, first and second resistors connected in shunt with each of said discharge tubes, a third resistor connected between one output terminal of said power supply and the first of said discharge tubes, means connecting the second of said discharge tubes to the other output terminal of said power supply, single pole push button switch having normally open and normally closed contacts, means connecting the pole of said switch to the common connection of said third resistor and said first discharge tube, means including said normally open contact and responsive to the actuation of said switch to decrease the resistance in shunt with the first discharge tube, fourth and fifth resistors serially connected between said other terminal of said power supply and ground, a third glow discharge tube having lower starting and sustaining characteristic voltages than each of said first and second discharge tubes, said third discharge tube connected between the common terminal of said fourth and fifth resistors and the said normally closed contact, and means including said third discharge tube and providing an indication of the operating state of said circuit.

3. A power interruption indicator comprising a line-operated unidirectional voltage supply, a current limiter, a first gaseous discharge tube having firing and sustaining potentials, means including said current limiter to apply a portion of the unidirectional voltage to the first discharge tube, said portion of the unidirectional voltage being less than said firing potential, switching means having actuated and unactuated states, a second gaseous discharge tube, means including the switching means in the unactuated state to apply the unidirectional voltage to the second discharge tube, and means including the switching means in the actuated state to apply the unidirectional voltage to the first discharge tube.

4. A power interruption indicator comprising a line-operated unidirectional voltage supply, a first gaseous discharge tube having firing and sustaining potentials, means including a resistor to apply a portion of the unidirectional voltage to the first discharge tube, said portion of the unidirectional voltage being less than said firing potential, switching means having actuated and unactuated states, a second gaseous discharge tube, means including said resistor and the switching means in the unactuated state to apply the unidirectional voltage to the second discharge tube, and means including said resistor and the switching means in the actuated state to apply the unidirectional voltage to the first discharge tube.

5. A power interruption indicator comprising a line-operated unidirectional voltage supply, a current limiter, a first gaseous discharge tube having firing and sustaining potentials, means including said current limiter to apply a portion of the unidirectional voltage to the first discharge tube, said portion of the unidirectional voltage being less than said firing potential, switching means having actuated and unactuated states, a second gaseous discharge tube, means including the switching means in the unactuated state to apply the unidirectional voltage to the second discharge tube, means including the switching means in the actuated state to apply the unidirectional voltage to the first discharge tube, and means disposed about one of the first and second discharge tubes to provide an indication of the operating state of said indicator.

6. A power interruption indicator comprising a line-operated unidirectional voltage supply, a current limiter, serially connected first and second gaseous discharge tubes having firing and sustaining potentials, means including said current limiter to apply portions of the unidirectional voltage to each of the first and second discharge tubes, said portions of the unidirectional voltage being less than said firing voltages, switching means having actuated and unactuated states, a third gaseous discharge tube, means including the switching means in the unactuated state to apply the unidirectional voltage to the third discharge tube, and means including the switching means in the actuated state to shunt the second discharge tube, whereby the second discharge tube receives a portion of said unidirectional voltage exceeding the firing voltage therefor when the switching means returns to the unactuated state and the potential across the first discharge tube is greater than said sustaining potential therefor.

7. A power interruption indicator comprising a line-operated unidirectional voltage supply, a current limiter, serially connected first and second gaseous discharge tubes having firing and sustaining potentials, means including said current limiter to apply portions of the unidirectional voltage to each of the first and second discharge tubes, said portions of the unidirectional voltage being less than said firing voltages, switching means having actuated and unactuated states, a third gaseous discharge tube, means including the switching means in the unactuated state to apply the unidirectional voltage to the third discharge tube, means including the switching means in the actuated state to shunt the second discharge tube, whereby the second discharge tube receives a portion of said unidirectional voltage exceeding the firing voltage therefor when the switching means returns to the unactuated state and the potential across the first discharge tube is greater than said sustaining potential therefor, and means to derive an output signal indicative of the operating state of said indicator from one of said discharge tubes.

8. A bistable circuit comprising: a line-operated direct-current power supply having a pair of output terminals; at least one gaseous discharge tube; current limiting means; a series circuit including said current limiting means, a first resistor and said discharge tube shunted by a second resistor and connecting the terminals of said power supply; another gaseous discharge tube having a lower starting characteristic voltage than said discharge tube in said series circuit; a switch having first and second circuits and having an actuated and an unactuated condition; means including the first circuit of said switch and responsive to the unactuated condition of said switch to connect said other discharge tube in shunt with the discharge tube in said series circuit; means including said second circuit of said switch and responsive to the actuated condition of said switch to decrease the resistance in said series circuit; and means to derive an output from one of said discharge tubes.

9. A bistable circuit comprising; a line-operated direct-current power supply having a pair of output terminals; a pair of gaseous discharge tubes each shunted by a resistor; current limiting means; a series circuit including said discharge tubes and said current limiting means and connecting the terminals of said power supply; another gaseous discharge tube having a lower starting characteristic voltage than each of the discharge tubes in said series circuit; a switch having first and second circuits and having an actuated and an unactuated condition; a voltage divider; means including the voltage divider and the first circuit of said switch and responsive to the unactuated condition of said switch to connect said other discharge tube in shunt with the pair of discharge tubes in said series circuit; means including said second circuit of said switch and responsive to the actuated condition of said switch to decrease the resistance in shunt with one of said pair of discharge tubes; and means to derive an output from one of said discharge tubes.

10. A bistable circuit comprising; a line-operated direct-current power supply having a pair of output terminals; a pair of gaseous discharge tubes each shunted by a resistor; a current-limiting resistor; a first series circuit including said discharge tubes and said current limiting resistor and connecting the terminals of said power supply; another gaseous discharge tube having a lower starting characteristic voltage than each of the discharge tubes in said series circuit; a switch having first and second circuits and having an actuated and an unactuated condition; a voltage divider connected between one output terminal of said power supply and ground and having an output tap; means including the current-limiting resistor, the first circuit of said switch and said other discharge tube and responsive to the unactuated condition of said switch to form a second series circuit; said second series circuit connecting the other output terminal of said power supply and the output tap on said voltage divider; means including said second circuit of said switch and responsive to the actuated condition of said switch to decrease the resistance in shunt with one of said pair of discharge tubes; and means to derive an output from one of said discharge tubes.

References Cited in the file of this patent
UNITED STATES PATENTS
2,432,104    Thomson _____ Dec. 9, 1947